(12) United States Patent
Suzuki

(10) Patent No.: US 7,178,377 B2
(45) Date of Patent: Feb. 20, 2007

(54) INCLINATION SENSOR

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 0 days.

(21) Appl. No.: 11/111,792

(22) Filed: Apr. 22, 2005

(65) Prior Publication Data
US 2005/0247118 A1   Nov. 10, 2005

(30) Foreign Application Priority Data
Apr. 23, 2004 (JP) ............. P.2004-128476

(51) Int. Cl.
*G01C 17/38* (2006.01)
(52) U.S. Cl. ............ 73/1.75; 73/1.39; 33/341; 33/391
(58) Field of Classification Search ............... 73/1.37, 73/1.38, 1.39, 1.75, 1.76, 1.77; 33/335, 336, 33/337, 340, 341, 343, 391; 701/38
See application file for complete search history.

(56) References Cited

U.S. PATENT DOCUMENTS 6,399,941 B1 * 6/2002 Nakagaki et al. ...... 250/231.13
6,499,220 B2 * 12/2002 Katsuki et al. ............. 33/391
6,853,918 B2 * 2/2005 Kozlowski et al. ......... 701/224
7,017,701 B2 * 3/2006 Flynn et al. ................ 180/282
2002/0050068 A1 * 5/2002 Katsuki et al. ............. 33/391
2002/0166756 A1 * 11/2002 Thompson ............... 200/61.52
2003/0167122 A1 * 9/2003 Kozlowski et al. ......... 701/224
2004/0094913 A1 * 5/2004 Flynn et al. ............. 280/6.153

FOREIGN PATENT DOCUMENTS

JP   2002-340553 A   11/2002

* cited by examiner

*Primary Examiner*—Eric S. McCall
(74) *Attorney, Agent, or Firm*—Sughrue Mion, PLLC

(57) ABSTRACT

An inclination sensor is provided with a main body fixed to a vehicle, a pendulum supported by the main body so as to swing in response to an inclination of the vehicle, and a magnetic sensor that senses the inclination of the pendulum in order to detect as to whether or not the vehicle has been inclined. The pendulum is swingable around two axes as to both a width direction of the vehicle, and forward/backward directions thereof. A sensitivity of the pendulum as to the width direction is higher than a sensitivity thereof as to the forward/backward directions.

9 Claims, 5 Drawing Sheets

INCLINATION SENSOR

The present application claims foreign priority based on Japanese Patent Application No. P.2004-128476, filed on Apr. 23, 2004, the contents of which are incorporated herein by reference.

THE INVENTION

1. Field of the Invention

The present invention relates to an inclination sensor, which is capable of sensing inclinations of a vehicle such as a motorcycle, bicycle, boat, and snowmobile, on which persons can ride.

2. Related Art

Disclosed in JP-A-2002-340553 is an inclination sensor mounted on a motorcycle for sensing a turning-over of the motorcycle. When the inclination sensor senses the turning-over of the motorcycle, an engine is stopped so as to prevent secondary accidents after the turning-over. In the inclination sensor, a pendulum swingable in accordance with inclinations of the motorcycle is installed in a main body of the inclination sensor. While a magnetic field area has been formed on one part of the pendulum, the inclination sensor is equipped with a magnetic sensor which is turned OFF if the motorcycle turns over, and is inclined.

In other words, when the motorcycle is brought into an inverted condition, a polarizing area of the pendulum is located opposite to the magnetic sensor, the magnetic sensor senses this polarizing area. On the other hand, if the motorcycle is inclined along right and left directions (namely, width direction), then the pendulum is swung, so that the polarizing area is separated from the magnetic sensor, and thus, the magnetic sensor is turned OFF. As a result, the inclination sensor is capable of sensing the inclinations of the motorcycle.

However, although the inclination sensor of JP-A-2002-340553 is capable of sensing the inclination as to the right and left directions (width direction) of the motorcycle, the inclination sensor is not capable of sensing an inclination as to the forward and backward directions thereof. In order to sense the forward and backward directions of the motorcycle in combination with the right and left directions, both a right/left direction-sensible inclination sensor and a forward/backward direction-sensible inclination sensor must be provided with the motorcycle. The right/left direction-sensible inclination sensor contains a pendulum which can be swung along the right and left directions. The forward/backward direction-sensible inclination sensor contains a pendulum which can be swung along the forward and backward directions. As a result, there is such a problem that a total number of structural components is increased due to the employment of such an additional inclination sensor.

Also, since sensitivities required to sense inclinations of a vehicle along both a width direction and forward/backward directions of this vehicle are different from each other, there is another problem that cumbersome sensitivity controls are necessarily required with respect to the width direction and the forward/backward directions. That is to say, a higher sensitivity is required in the width direction in order that a sensor must quickly sense an inclination when the motorcycle turns over. To the contrary, a sensitivity of the forward/backward direction must be suppressed to a low sensitivity, because there is such a risk that when the motorcycle is accelerated, or decelerated, the pendulum is swung.

Therefore, one or more embodiments of the present invention provides an inclination sensor in which both an inclination as to a width direction of a vehicle and an inclination as to forward/backward directions of the vehicle can be sensed by a single sensor, and further, controlling of sensitivities for sensing inclinations both in the width direction and the forward/backward directions is no longer required.

SUMMARY OF THE INVENTION

In accordance with one or more embodiments of the present invention, an inclination sensor comprises a main body fixed on a vehicle; a pendulum swingably supported by the main body and swings in response to an inclination of the vehicle; and a sensor unit for sensing swinging motion of the pendulum in order to detect as to whether or not the vehicle has been inclined.

In the inclination sensor the pendulum is swingable in two axes as to both a width direction of the vehicle and forward/backward direction thereof, and a sensitivity to the width direction is higher than a sensitivity as to the forward/backward direction.

In accordance with one or more embodiments of the present invention, the inclination sensor further comprises a ring member provided in the main body and swingable around a shaft portion, wherein the shaft portion is provided on the ring member and extending along the width direction; and a shaft member extending along the forward/backward direction within the ring member, wherein the pendulum is swingable around a shaft member.

In accordance with one or more embodiments of the present invention, the inclination sensor further comprises a magnetic field area formed on the pendulum, wherein the sensor unit senses the magnetic field area in a non-contact manner.

In accordance with one or more embodiments of the present invention, the inclination sensor further comprises a magnetic field area formed on the pendulum, wherein the sensor unit senses the magnetic field area in a non-contact manner.

In accordance with one or more embodiments of the present invention, an inclination sensor comprises a main body; a ring member provided in the main body and including a shaft portion extending in a first axis, wherein the ring member is swingable around the shaft portion; a shaft member extending in a second axis and penetrating the ring member, wherein the first axis and the second axis are orthogonal; and a pendulum provided on the shaft member and swingable around the shaft member.

In accordance with one or more embodiments of the present invention, the inclination sensor further comprises a magnetic field area formed on the pendulum; and a magnetic sensor for sensing a magnetic force line from the magnetic field area.

In accordance with one or more embodiments of the present invention, the main body is fixed on a vehicle the first axis extends in a width direction of the vehicle, the second axis extends in a forward/backward direction of the vehicle, and the pendulum swings in response to an inclination of the vehicle.

Other aspects and advantages of the invention will be apparent from the following description and the appended claims.

In accordance with one or more embodiments of the present invention, both the inclination as to the width direction of the vehicle and the inclination as to the forward/backward directions thereof can be detected by the single sensor, and the sensitivity for sensing the inclination along the width direction of the vehicle has been previously set to be higher than the sensitivity for sensing the inclination along the forward/backward directions thereof. As a result, the sensitivity controls are no longer required.

In accordance with one or more embodiments of the present invention, when the vehicle is inclined along the width direction, the pendulum is independently swung with respect to the ring member. On the other hand, when the vehicle is inclined along the forward/backward directions, both the pendulum and the ring member are mutually swung. As a result, the sensitivity achieved when the vehicle is inclined along the width direction is made different from the sensitivity achieved when the vehicle is inclined along the forward/backward directions due to a difference in inertia. As a consequence, such a setting operation for increasing the sensitivity for sensing the vehicle along the width direction higher than the sensitivity for sensing the vehicle along the forward/backward directions is no longer required.

In accordance with one or more embodiments of the present invention, since the magnetic field area of the pendulum can be sensed in the non-contact manner so as to detect the inclination of the vehicle, the swinging motion of the pendulum can be detected in high precision, and also, the lifetime of the inclination sensor can be prolonged.

Figure 1:
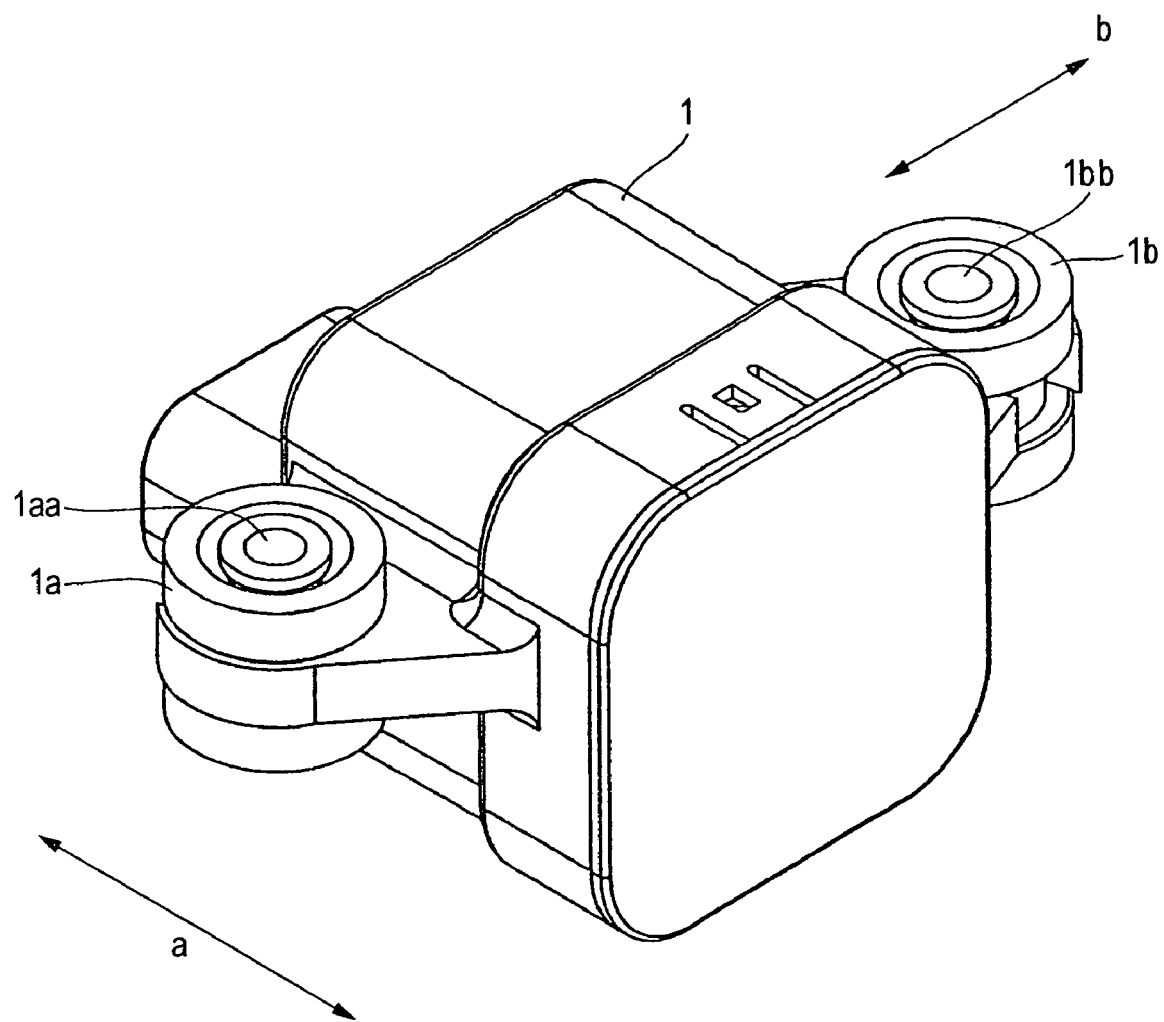
FIG. 1 is a perspective view for showing an outer appearance of an inclination sensor according to an embodiment of the present invention.

REFERENCE NUMERALS AND CHARACTERS 1 inclination sensor main body (main body)
2 pendulum
2a magnetic field area
3 shaft member
4 ring member
4a shaft portion
5 board
6 magnetic sensor (sensor unit)
7 terminal

DESCRIPTION OF THE PREFERRED EMBODIMENTS

Next, embodiments of the invention will be described with reference to the accompanying drawings.

An inclination sensor according to this embodiment mode is mounted on a motorcycle (not shown) so as to sense an inclination as to a width direction of the motorcycle and also to sense an inclination as to forward and backward directions thereof.

Figure 2:
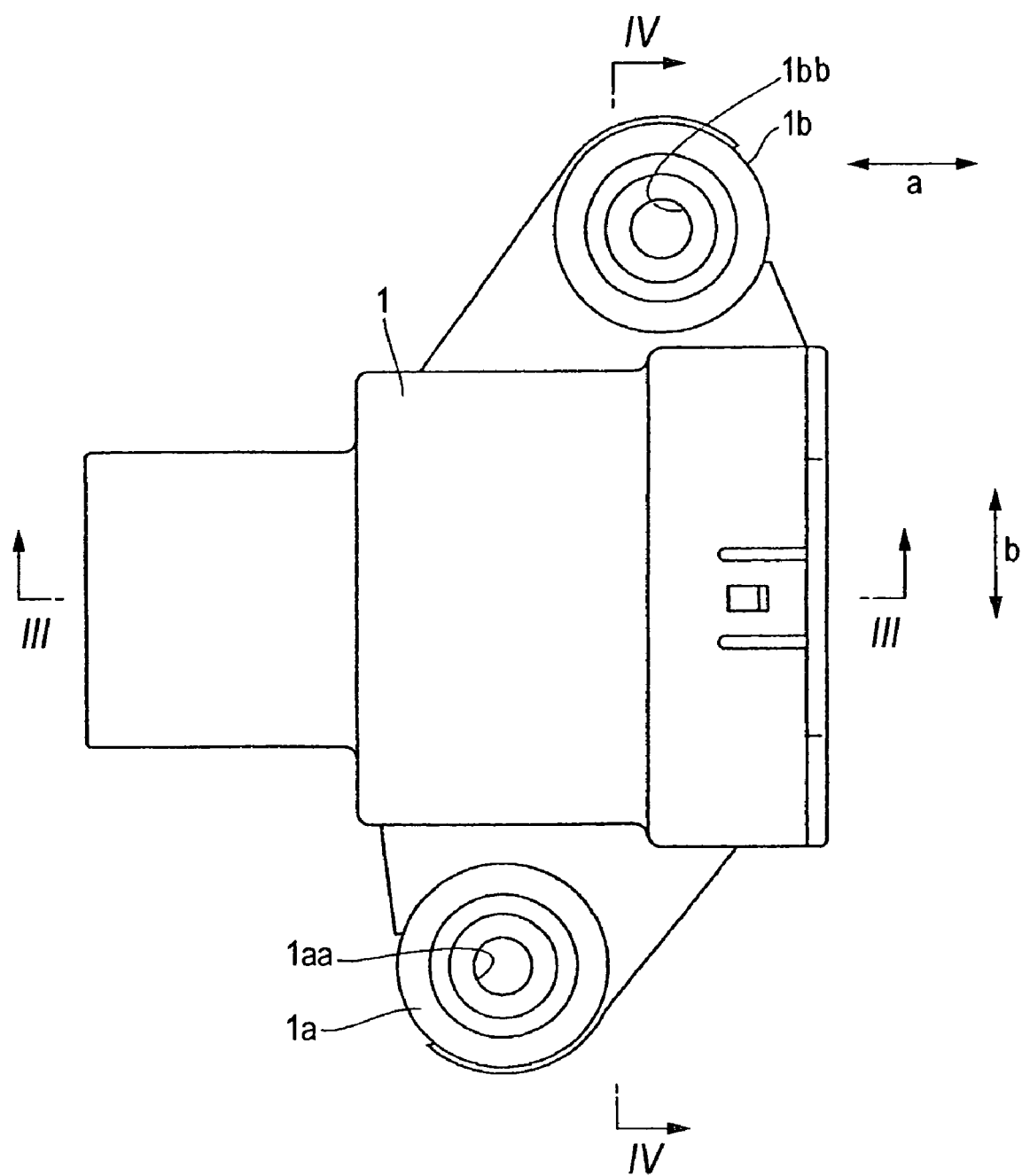
FIG. 2 is a plan view for representing the inclination sensor.

As indicated in FIG. 1 and FIG. 2, the inclination sensor of the embodiment has been constituted while an inclination sensor main body 1 is employed as a housing. Both a bracket portion 1a and another bracket portion 1b have been extended from the inclination sensor main body 1. Bolts (not shown) are penetrated through bolt holes 1aa and 1bb formed in these bracket portions 1a and 1b so as to fix the inclination sensor on a vehicle body of the motorcycle.

In other words, since the inclination sensor main body 1 corresponding to the housing of this inclination sensor is fixed on the motorcycle and is operated with the motorcycle in an integral manner, the inclination sensor has been arranged in such a manner that the inclination sensor may be also inclined in response to an inclination of the motorcycle. Also, a fixing direction of the inclination sensor according to the embodiment with respect to the motorcycle has been previously set. In the drawings, the inclination sensor is mounted in such a manner that forward/backward directions "a" of the motorcycle may constitute a longitudinal direction of the inclination sensor main body 1, and a width direction "b" of the motorcycle may constitute a direction perpendicular to the longitudinal direction of the inclination sensor main body 1.

Figure 3:
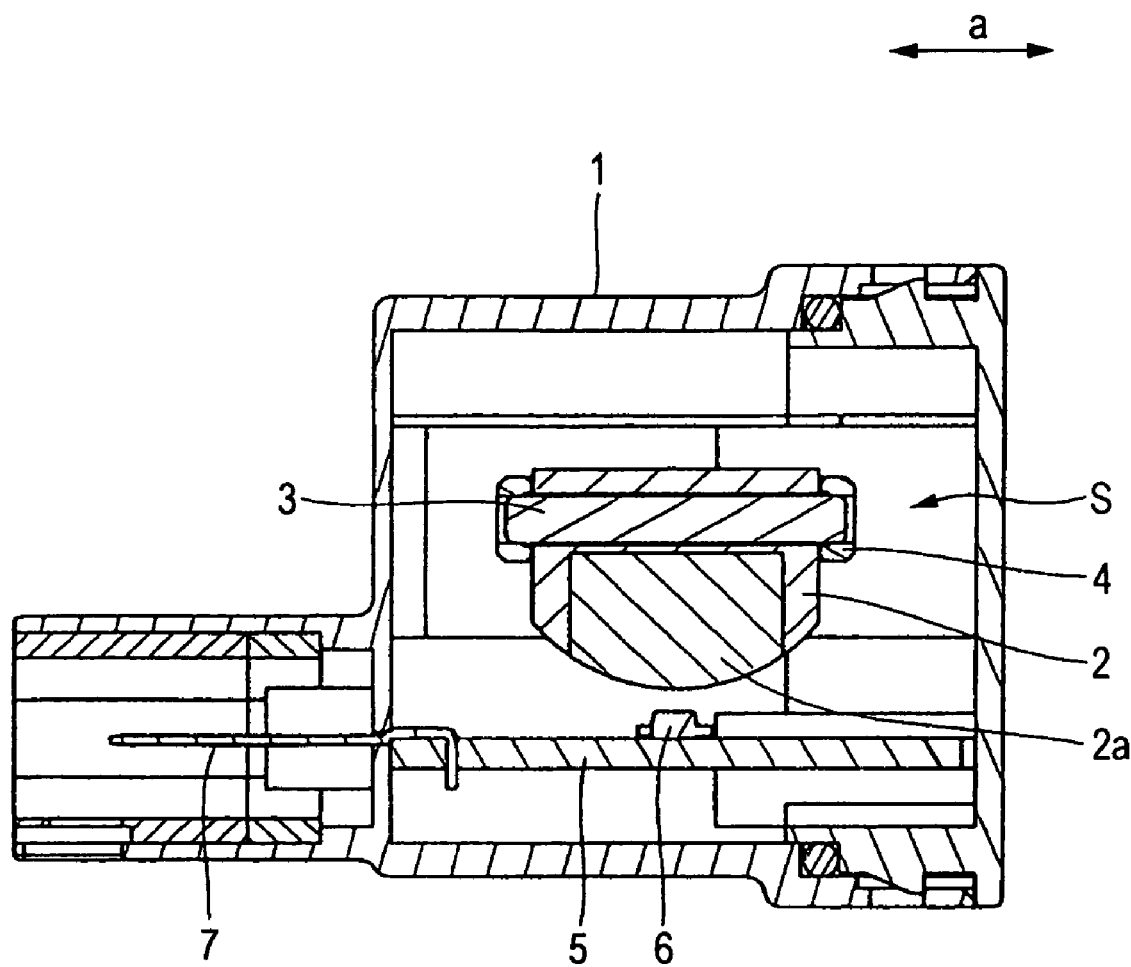
FIG. 3 is a sectional view for indicating the inclination sensor, taken along a line III—III of FIG. 2.
Figure 4:
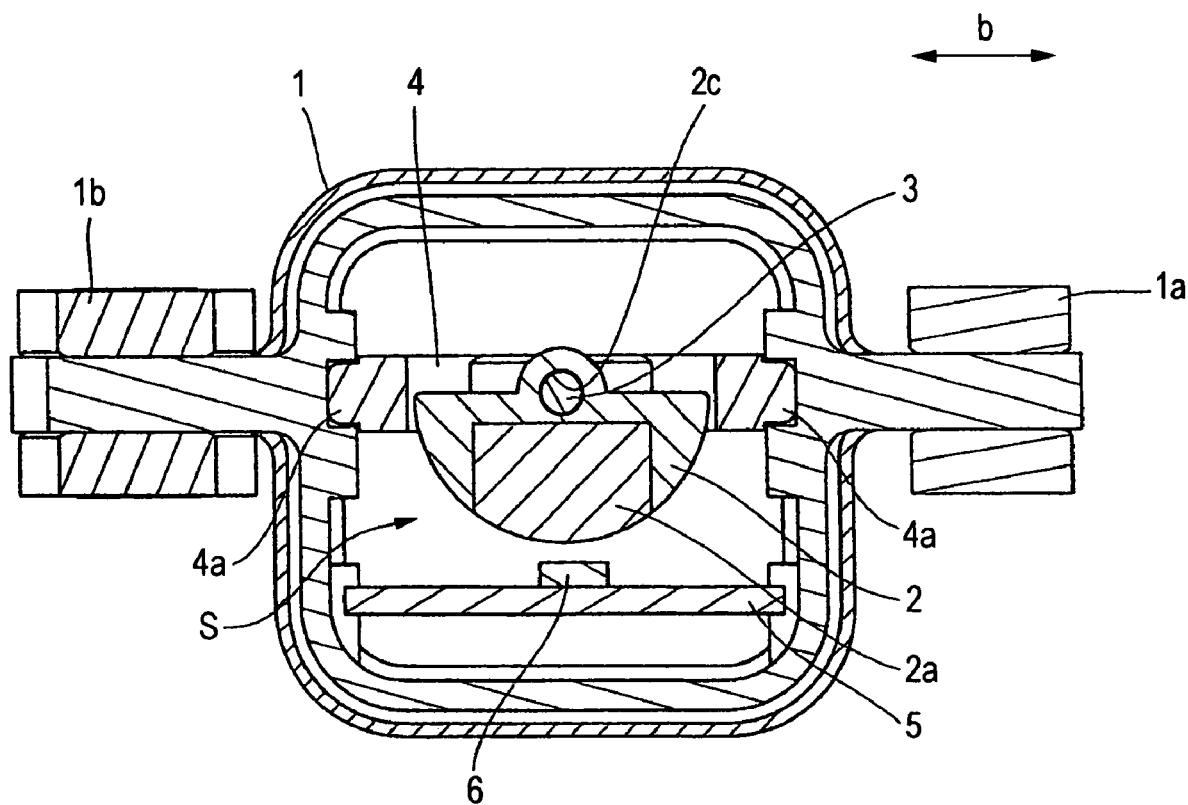
FIG. 4 is a sectional view for indicating the inclination sensor, taken along a line IV—IV of FIG. 2.

The inclination sensor body 1 is made of a synthetic resin. As represented in FIG. 3 and FIG. 4, a storage space "S" has been formed in an inner portion of the inclination sensor main body 1. In the storage space "S", a pendulum 2 is swingable.

In addition to the pendulum 2, a board 5 where a magnetic sensor 6 has been formed, a shaft member 3, a ring member 4, and the like have been arranged in the storage space "S." Also, the storage space "S" has been sealed by a sealing member, or the like so as to be brought into a sealed condition by which rain water and foreign materials cannot be entered into the storage space "S."

While the pendulum 2 owns predetermined mass and is swingable with respect to the inclination sensor main body 1 around the shaft member 3 as a center position, the pendulum 2 has been arranged in such a manner that the pendulum 2 may be swung in response to inclinations (namely, both inclinations as to forward/backward directions "a" and width direction "b") of the motorcycle. Also, while a magnetic field area 2a has been formed in a portion of a lower end portion in the pendulum 2, the magnetic field area 2a may be swung in conjunction with the pendulum 2. The magnetic field area 2a is produced from, for example, a plastic magnet.

Figure 5:
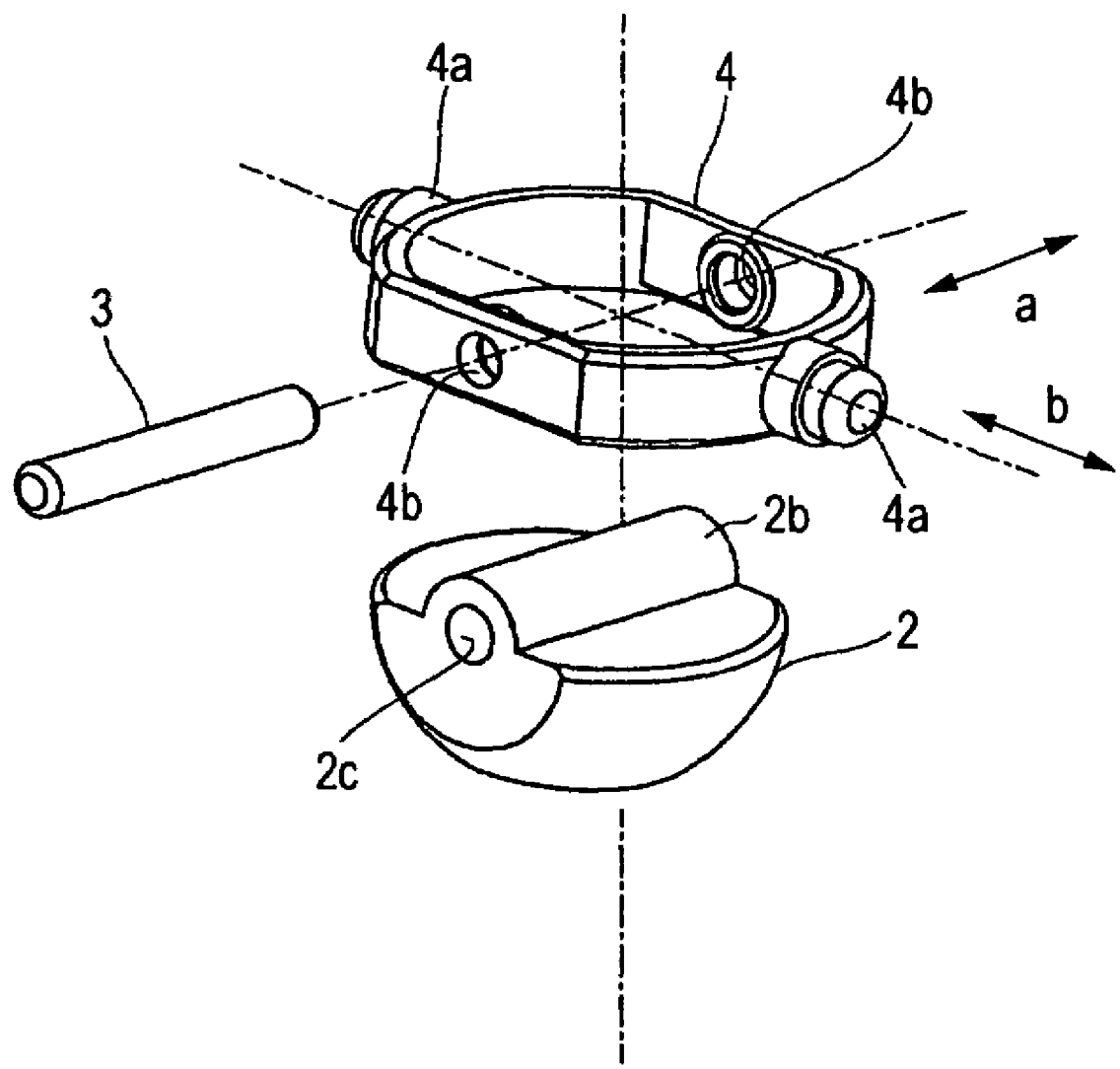
FIG. 5 is an exploded perspective view for representing both a pendulum and a ring member in the inclination sensor.

Also, as represented in FIG. 5, an expansion portion 2b which is upwardly expanded has been formed on an upper portion of the pendulum 2, and a through hole 2c has been formed in the expansion portion 2b. The shaft member 3 which is extended along the forward/backward directions "a" of the motorcycle can pass through the through hole 2c. While this shaft member 3 has also penetrated into through holes 4b of the ring member 4, the pendulum 2 has been constructed in such a manner that when the motorcycle is inclined along the width direction "b", the pendulum 2 may be independently swung with respect to the ring member 4. The through holes 4b of the ring member 4 correspond to round holes which have been formed in this ring member 4, by which the pendulum 2 may be swung at a center portion, and into which the pendulum 2 may be penetrated.

On the other hand, convex-shaped shaft portions 4a which are extended along the width direction "b" of the motorcycle have been formed on the ring member 4. Thus, the ring member 4 has been supported by the convex-shaped shaft portions 4a in a freely swingable manner with respect to the inclination sensor main body 1. As a consequence, when the motorcycle is inclined along the forward/backward directions, both the pendulum 2 and the ring member 4 have been arranged in such a manner that these pendulum 2 and ring member 4 are swung while the shaft portions 4a are set as a center portion. It should be understood that if the ring member 4 owns predetermined mass and further has a rigidness capable of supporting the pendulum 2, then any of materials may be employed.

As indicated in FIG. 3 and FIG. 4, the magnetic sensor 6 has been arranged at such a position which is located under the pendulum 2 within the storage space "S" and located opposite to the magnetic field area 2a. The magnetic sensor 6 may function as a sensor unit capable of sensing a magnetic force line which is produced from the magnetic field area 2a of this pendulum 2. As a result, if the motorcycle is inclined and thus the pendulum 2 is swung, then the magnetic field area 2a is separated from the magnetic sensor 6, so that the magnetic force line generated from this magnetic field area 2a is not sensed by the magnetic sensor 6. As a consequence, the magnetic sensor 6 can sense such a condition that the motor cycle has been inclined.

As previously explained, the magnetic field area 2a of the pendulum 2 is detected by the magnetic sensor 6 in the non-contact mode, and thus, the inclination of the motorcycle can be sensed, so that the swinging motions of the pendulum 2 can be detected in high precision, as compared with that of a contact detecting type sensor. In addition, the lifetime of the inclination sensor can be prolonged. It should also be noted that as to the above-described magnetic sensor 6, if magnetic sensors can sense the magnetic force line of the magnetic field area 2a, then various sorts of general-purpose magnetic sensors may be employed. For instance, a Hall sensor, a magnetic resistive sensor, and the like may be used. Alternatively, if sensors are capable of sensing either an approach or a separation of the magnetic field area 2a, then contact type sensors may be employed.

As indicated in FIG. 3, a predetermined circuit has been formed on the board 5 where the magnetic sensor 6 has been arranged, and also, a terminal 7 has been formed on this board 5. The terminal 7 is extended up to an external portion from the inclination sensor main body 1. This terminal 7 has been electrically connected to the magnetic sensor 6. While a wiring line (not shown) derived from the motorcycle has been electrically connected to the terminal 7, sensor signals derived from the magnetic sensor 6 may be transmitted to the motorcycle. When the motorcycle is not inclined, an "ON" sensor signal is transmitted, whereas when the motorcycle is inclined, an "OFF" sensor signal is transmitted.

As a consequence, in the case that a sensor signal is transmitted from the magnetic sensor 6 to the motorcycle and a judging means (for instance, timer circuit) judges that this status has elapsed for a predetermined time period, a control unit (not shown in detail) recognizes that the motorcycle has turned over, and then, instructs an ECU (engine control unit), or the like which is mounted on the motorcycle in such a way that the engine thereof can be forcibly stopped. As a consequence, the secondary accident occurred when the motorcycle turns over can be effectively avoided.

In accordance with the above-explained inclination sensor, when the motorcycle is inclined in any one of the right/left directions (width direction), the pendulum 2 is independently swung with respect to the ring member 4 while the shaft member 3 is set to the center position, and thus, the magnetic sensor 6 can be turned OFF (namely, magnetic sensor 6 can sense inclination of motorcycle). Further, when the motorcycle is inclined in any of the forward/backward directions, both the pendulum 2 and the ring member 4 are mutually swung while the shaft portions 4a are set to the center position, and thus, the magnetic sensor 6 can be turned OFF (namely, magnetic sensor 6 can sense inclination of motorcycle). As a consequence, since both the inclination as to the width direction of the motorcycle and the inclination as to the forward/backward directions thereof can be sensed by a single sensor (namely, inclination sensor), a total number of the structural components can be reduced which should be assembled to the motorcycle as the inclination sensor.

When the motorcycle is inclined in the width direction, the pendulum 2 is solely swung, whereas when the motorcycle is inclined in the forward/backward directions, both the pendulum 2 and the ring member 4 are mutually swung. As a result, a sensitivity achieved when the member having the small mass (namely, only pendulum 2) is swung during the inclination thereof along the width direction may become high, as compared with a sensitivity achieved when the member having the large mass (namely, pendulum 2 in combination with ring member 4) is swung during the inclination thereof along the forward/backward directions, because there is a difference in inertia.

In other words, if the inclination sensor having the two axes is arranged on the motorcycle in the above-explained manner of this embodiment mode, then the sensitivity of this inclination sensor along the width direction may be automatically increased due to the structural aspect. Concretely speaking, the inclination sensor having the two axes is arranged in such a way that the swinging motion along the width direction is performed by only the pendulum 2, and the swinging motion along the forward/backward directions is performed by both the ring member 4 and the pendulum 2. As a consequence, the accurate sensitivity control operation which has been carried out in the conventional inclination sensor is no longer required in the embodiment. It should also be noted that a relative level control between the sensitivity of the width direction and the sensitivity of the forward/backward directions may be arbitrarily set by making relative mass different from each other by selecting a material of either the pendulum 2 or the ring member 4, alternatively by making shapes of these structural members 2 and 4 different from each other.

While the inclination sensor of the present embodiment has been described in detail, the present invention is not limited thereto, but may be modified. For instance, if an inclination sensor is equipped with a pendulum swingable in response to an inclination as to either a width direction of a motorcycle or forward/backward directions thereof, and the inclination sensor is capable of sensing the swinging motion of the pendulum in order to judge as to whether or not the motorcycle has been inclined, then either an approach or a separation of a magnetic field area may be alternatively sensed by other sensor units, instead of the above-described magnetic sensor 6. Further, although the inclination sensor of the embodiment has been applied to the motorcycle, the inclination sensor may be alternatively applied to other vehicles (for example, boat, ATV (All Terrain Vehicle), snowmobile, water vehicle, buggy etc.) capable of embarking thereon persons.

The inclination sensor can be applied to an inclination sensor having a different outer appearance, or an inclination sensor additionally equipped with other functions. In the above-described inclination sensor of the vehicle, a pendulum may be swung along two axes as to a width direction of the vehicle, and forward/backward direction thereof, and further, a sensitivity of the width direction is higher than a sensitivity of the forward/backward directions.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An inclination sensor, comprising:
a main body fixed on a vehicle;
a pendulum swingably supported by the main body and swings in response to an inclination of the vehicle; and
a sensor unit for sensing swinging motion of the pendulum in order to detect as to whether or not the vehicle has been inclined,
wherein the pendulum is swingable in two axes as to both a width direction of the vehicle and forward/backward direction thereof, and
a sensitivity to the width direction is higher than a sensitivity as to the forward/backward direction.

2. The inclination sensor according to claim 1, further comprising:
a ring member provided in the main body and swingable around a shaft portion,
wherein the shaft portion is provided on the ring member and extending along the width direction; and
a shaft member extending along the forward/backward direction within the ring member, wherein the pendulum is swingable around the shaft member.

3. The inclination sensor according to claim 1, further comprising:
a magnetic field area formed on the pendulum,
wherein the sensor unit senses the magnetic field area in a non-contact manner.

4. The inclination sensor according to claim 2, further comprising:
a magnetic field area formed on the pendulum,
wherein the sensor unit senses the magnetic field area in a non-contact manner.

5. An inclination sensor, comprising:
a main body;
a ring member provided in the main body and including a shaft portion extending in a first axis, wherein the ring member is swingable around the shaft portion;
a shaft member extending in a second axis and penetrating the ring member, wherein the first axis and the second axis are orthogonal; and
a pendulum provided on the shaft member and swingable around the shaft member.

6. The inclination sensor according to claim 5, further comprising:
a magnetic field area formed on the pendulum; and
a magnetic sensor for sensing a magnetic force line from the magnetic field area.

7. The inclination sensor according to claim 5, wherein the main body is fixed on a vehicle,
the first axis extends in a width direction of the vehicle,
the second axis extends in a forward/backward direction of the vehicle, and
the pendulum swings in response to an inclination of the vehicle.

8. The inclination sensor according to claim 5, wherein, as a result of the first and second axes, the pendulum is swingable in two axes and a sensitivity of the inclination sensor due to the swinging of the pendulum about one of the two axes is higher than a sensitivity of the inclination sensor due to the swinging of the pendulum about the other of the two axes.

9. The inclination sensor according to claim 5, wherein the ring member is swingable relative to the main body.

* * * * *